March 25, 1969  R. M. O'BANNON  3,434,513
COMBINED LIQUID DISPENSER AND LIQUID LEVEL INDICATOR
Filed April 7, 1966
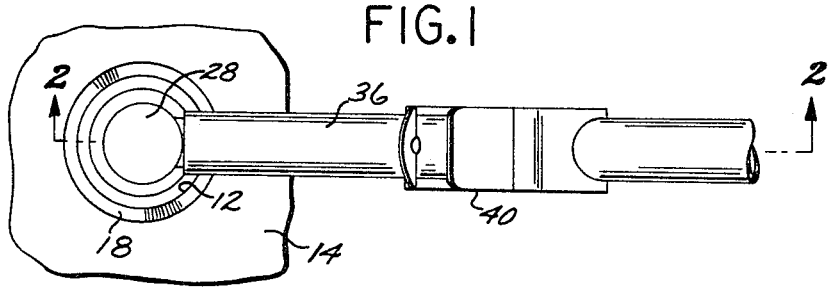
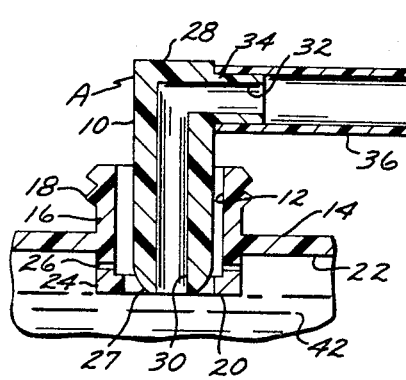
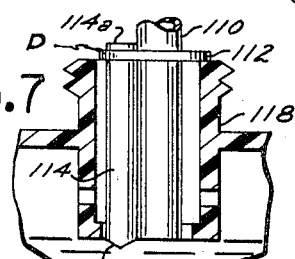
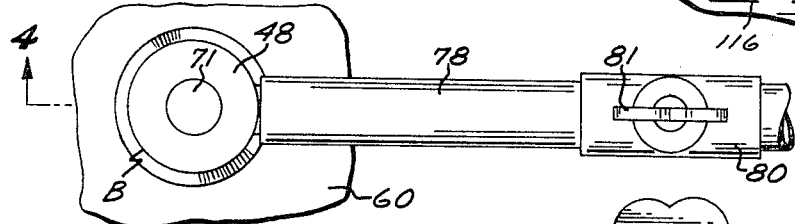
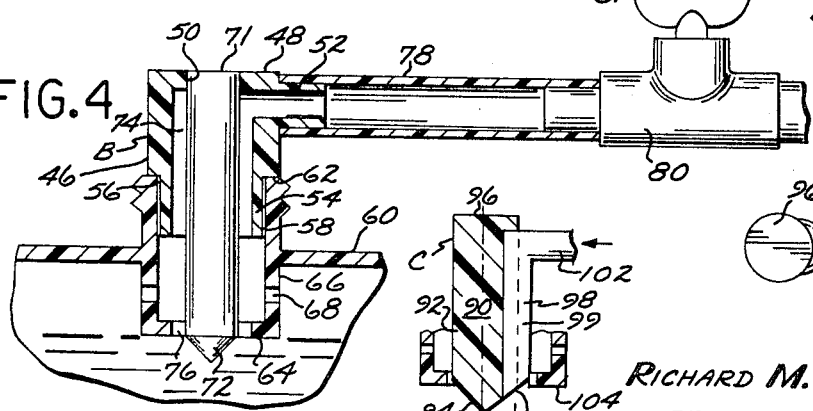
INVENTOR.
RICHARD M. O'BANNON
BY
*William C. Bobrick*
ATTORNEY United States Patent Office 3,434,513
Patented Mar. 25, 1969

3,434,513
COMBINED LIQUID DISPENSER AND LIQUID
LEVEL INDICATOR
Richard M. O'Bannon, 188 Coral View Ave.,
Monterey Park, Calif. 91754
Filed Apr. 7, 1966, Ser. No. 540,976
Int. Cl. B65b 1/30, 39/00
U.S. Cl. 141—95                                       9 Claims

ABSTRACT OF THE DISCLOSURE

A combined liquid dispensing and liquid level indicating device for use in filling storage batteries of the type which include liquid inlets, with target rings situated a predetermined distance therebelow.

During the past few years, it has become common practice to sell storage batteries in the dry state, with the liquid acid used therein being shipped in separate containers. Each of these containers may hold acid for filling either a single battery, or a member of batteries. Irrespective of the quality of acid held in each container, acid must be added to each cell of new battery in sufficient quantity that the liquid level therein is adjacent a target ring, or other indicator forming an integral part of the battery. Each cell of a storage battery normally has a target ring situated therein, located directly below the liquid inlet.

Filling each cell of a new battery with acid to a predetermined elevation is a slow, tedious job, and frequently is carried out under adverse conditions in a filling station where the attendant may be interrupted several times before the filling operation is completed. Furthermore, it is difficult to see into the interior of the battery cells, and as a result, batteries are frequently either underfilled or overfilled with acid, and either underfilling or overfilling of battery cells can drastically shorten the life of the batery.

A major object of the present invention is to provide a combined acid dispenser and liquid level indicator of simple structure which is easy to use, can be fabricated from standard, commercially available materials, and produced at a sufficiently low cost as to encourage widespread use thereof, and due to its low production cost, the device may even be included with a package of acid as a disposable item.

Another object of the invention is to supply a device, which when used, will assure proper filling of a storage battery with acid to the right liquid level therein in far less time than required for the filling of a battery by previously available devices used for this purpose.

These and other objects and advantages of the present invention will become apparent from the following description of a number of forms thereof, and from the accompanying drawings illustrating the same, in which:

FIGURE 1 is a top plan view of a first form of the combined liquid dispenser and liquid level indicating device;

FIGURE 2 is a combined side elevational and longitudinal cross-sectional view of the device connected to an acid container, taken on the line 2—2 of FIGURE 1;

FIGURE 3 is a top plan view of a second form of the invention;

FIGURE 4 is a combined side elevational and longitudinal cross-sectional view of the second form of the device connected to an acid container, taken on the line 4—4 of FIGURE 3;

FIGURE 5 is a side elevational view of a third form of the device in contact with the target ring of a storage battery;

FIGURE 6 is a top plan view of the invention shown in FIGURE 5; and

FIGURE 7 is a side elevational view of a fourth form of the device.

The first form of the dispenser of the present invention includes an elongate transparent body A preferably formed from a commercially available polymerized resin such as Lucite, or the like. The body A comprises a vertically extending portion 10 of less transverse cross section than that of an inlet 12 on a storage battery cell 14, that is defined by an upwardly extending cylindrical boss 16 having threads 18 that can be engaged by a threaded cap (not shown).

A target ring 20 that has an internal diameter of less than that of portion 10 is disposed under the inlet 12. Ring 20 is supported at a fixed elevation below the top 22 of the cell 14 by a downwardly extending cylindrical wall 24 in which a number of circumferentially spaced openings 26 are formed. The portion 10 has a downwardly and inwardly curving lower end 27, and a flat upper end 28. A longitudinally extending bore 30 is formed in the portion 10, which is in communication with a second bore 32 that is partially defined in a leg 34 and extends outwardly from the upper part of the portion 10 at an angle of substantially 90° relative thereto.

The tubular leg 34 is frictionally gripped by one end of a resilient tube 36 that is connected to the interior of a collapsible package 38 of the type in which battery acid is merchandised. When the container 38 is held in an inverted position such as shown in FIGURE 2, and the elongate body A so disposed as to extend downwardly through the inlet 12, acid from the container may be dispensed into the confines of one of the batery cells 14.

A resilient clip 40 is mounted on the tube 36 (FIGURE 2), with the clip when placed in the closed position collapsing the tube to prevent flow of acid therethrough from the container 38 to the interior of the cell 14. The lower end 27 is so curved that when it contacts the inner upper portion of the ring 20, the lower extremity of the portion 10 is substantially flush with the lower surface of the ring 20. The material defining the portion 10 has the property of transmitting light from the ambient atmosphere downwardly therethrough, and reflects the light upwardly from the lower surface 27 thereof. When a user views the surface 28, this reflective light gives the impression that the lower end of portion 10 is illuminated.

However, when the acid 42 in cell 14 has risen to the extent that the liquid level thereof contacts the surface 27, this previously reflective light is absorbed by the acid, and the surface 28 then appears to be dark. When the surface 28 darkens, a visual signal is given that the proper quantity of acid has been added to a cell, and the clip 40 is manually closed. The above described operation may thereafter be repeated on each of the remaining battery cells until the battery is completely filled with acid.

The proper liquid level for acid in each battery cell is normally reached when the liquid level of the acid is just in contact with the lower surface of the ring 20, or when the ring is submerged in the acid. In the present illustration, as shown in FIGURE 2, when the ring 20 is completely submerged in the acid in a cell, the surface 27 will be substantially contacted by the acid and substantially no light will be reflected upwardly to the upper surface 28.

A second form B of the device is shown in FIGURES 3 and 4 that includes a cylindrical shell 46 formed of an opaque rigid material, with the shell having a closed upper end 48 in which a centrally disposed opening 50 is formed. A tubular liquid inlet 52 extending outwardly from the upper portion of shell 46, and the inlet is disposed at substantially a right angle relative to the longitudinal axis of the shell. A tubular extension 54 of lesser diameter depends from shell 46.

A circumferentially extending body shoulder 56 is defined at the junction of the shell 46 and extension 54. The external diameter of the extension 54 is such that it fits loosely within the confines of a liquid inlet boss 58 of a storage battery 60 when the body shoulder 56 rests on the upper extremity 62 of the boss. A target ring 64 is supported in the battery below the inlet boss 58 by a cylindrical shell 66 having a number of circumferentially spaced openings 68 formed therein. An elongate body 70 formed of a polymerized resin such as Lucite, or the like, is longitudinally disposed in the shell 46, and the upper end thereof is bonded by adhesive or the like, to the surface portion of the top 48 that defines the opening 50.

The body 70 has a downwardly and inwardly tapering lower end 72, as can best be seen in FIGURE 4, which is disposed below the lower surface of the ring 64. The body 70 is of such diameter that it cooperates with the shell 46 to define an annulus-shaped space 74 therebetween. The body 70 is also of such diameter that an annulus-shaped space 76 is provided between the exterior surface of the body and the interior surface of the ring 64.

The tubular inlet 52 is frictionally engaged by one end of a resilient tube 78 that extends to a stop cock 80, which is connected by a second resilient tube 82 to a collapsible container 84 of the type in which storage battery acid is merchandised and shipped. When the container 84 is disposed in an inverted position as shown in FIGURE 4, and the handle 81 of stop cock 80 rotated to place the stop cock in an open position, liquid acid can flow from the tube 78 through the inlet 52 into the space 74 to discharge downwardly therein into the confines of battery cell 14. The liquid will so flow until sufficient liquid has been added to the battery cell as to raise the liquid level thereof so that it contacts the lower surface of the rings 64 and the tapered surface 72 is completely submerged. Light previously reflected upwardly from the surface 72 is then absorbed by the liquid acid in the battery, and the upper surface 71 of the body 70 will now appear dark. When the upper surface 71 is so darkened, it is an indication that the liquid level in the battery is at a proper height, and the handle 81 is rotated to place the stop cock 80 in a closed position.

The above described operation is subsequently repeated on each cell of the storage battery, until the battery is completely filled with liquid. In the second form B of the invention, positioning of the lower surface 72 in the cell is effected by bringing the body shoulder 56 into contact with the upper surface of the boss 58. The upper surface of the liquid inlet boss 58 on all modern-day batteries is at a fixed elevation above the ring 64, whereby either the ring can be used in positioning the liquid dispenser as shown in FIGURES 1 and 2, or the boss can be used for this purpose, as shown in FIGURES 3 and 4.

A third form C of the invention is shown in FIGURES 5 and 6 that includes an elongate body 90 formed of a transparent polymerized resin, such as Lucite, or the like. The body 90 comprises a cylindrical side wall 92, tapered lower end 94, and flat upper end 96. A hollow housing 98, open on one longitudinal side thereof, is bonded by conventional means (not shown) to the side wall 92, and together with the body 90, cooperatively defines a longitudinally extending confined space 99. The housing 98 has a lower open end 100 through which liquid acid can escape, and a tubular liquid inlet 102 at the top thereof which can be connected to a flexible tube (not shown) that extends to a liquid acid supply (not shown). The lower end 94 of the body 90 removably engages the interior of a target ring 104 of a battery cell (not shown). The third form of the device is used in the same manner as the first form A thereof described above.

A fourth form D of the device is shown in FIGURE 7 that includes a tube 110 that has a flange 112 extending outwardly therefrom. The tube 110 is adapted to have a resilient tube (not shown) connected to the upper end thereof, with this resilient tube extending to an acid supply. An elongate body 114 is disposed adjacent tube 110 and depends from flange 112. Body 114 is formed from a transparent polymerized resin. The body 114, as can best be seen in FIGURE 7, has a tapered lower end 116. When the flange 112 is seated on the upper edge of a filling boss 118 of a storage battery, the lower end 116 will be immersed in the acid solution when the liquid level of the solution has risen to a desired elevation. When the acid solution has risen to this elevation, the upper end 114a will appear dark. The fourth form D of the invention is used in the same manner and for the same purpose as the first, second and third forms of the device. The tube 110, flange 112 and body 114 may all be fabricated from a clear polymerized resin such as Lucite, or the like.

The use and operations of the four forms of the device have been described in detail herein and need not be repeated. Although the light-transmitting bodies have been described as being formed from a polymerized resin, other light-transmitting and reflecting materials may be used for this purpose.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. A combined liquid dispensing and liquid level indicating device for use on a storage battery having at least one liquid inlet and a target ring therein below said inlet, including:
  (a) a transparent elongate body having upper and lower ends, which body has a transverse cross section that is smaller than the cross section of said inlet to permit said body to be extended downwardly through said inlet to dispose said lower end at a desired position relative to said ring, said body when so disposed reflecting light that travels downwardly therethrough from the ambient atmosphere back towards a user to give the impression that said lower end is illuminated, but which body ceases to reflect said light when the liquid in said battery has risen to a level where it is at least partially in contact with said lower end, with said upper end when said lower end is at least partially contacted by said liquid appearing to be dark;
  (b) first means for discharging liquid into said battery inlet through a fixed path relative to said elongate body; and
  (c) second means for removably holding said lower end of said body at said desired position relative to said ring when said body extends downwardly through said inlet.

2. A device as defined in claim 1, wherein said first means comprises a rigid body defined by a cylindrical shell having a greater internal diameter than that of said body, an upper end in which an opening is formed and from which said body is held in a depending position, and a tubular liquid inlet extending outwardly from said shell and is in communication with an annulus-shaped space defined between said body and the interior surface of said shell.

3. A device as defined in claim 2 wherein said second means is a circular body shoulder formed on said shell that removably engages the upper extremity of said inlet.

4. A device as defined in claim 2 wherein said second means is a downwardly and inwardly tapering surface that defines said lower end and removably engages said ring.

5. A device as defined in claim 1 wherein said first means is a bore that extends longitudinally through said body.

6. A device as defined in claim 5 wherein said second means is a downwardly and inwardly extending surface that defines said lower end and removably engages said ring.

7. A device as defined in claim 1 wherein said first means comprises a housing open on one side that is bonded to said body to cooperate therewith and define a confined space that is open at the bottom to permit discharge of liquid therefrom, which housing has a liquid inlet formed in the upper portion thereof.

8. A device as defined in claim 7 which further includes a tube that extends outwardly from said water inlet.

9. A device as defined in claim 8 wherein said second means is a downwardly and inwardly extending surface that defines said lower end and removably engages said ring.

References Cited

UNITED STATES PATENTS

| | | | |
|---|---|---|---|
| 764,422 | 7/1904 | Burgess | 141—94 |
| 2,847,042 | 8/1958 | Edelmann | 141—94 |

HOUSTON S. BELL, JR., *Primary Examiner.*

U.S. Cl. X.R.

136—162; 222—159